United States Patent
Fahrner et al.

(10) Patent No.: US 7,648,368 B2
(45) Date of Patent: Jan. 19, 2010

(54) AIRCRAFT PROPELLER ASSEMBLY

(75) Inventors: Alan John Fahrner, Canton, OH (US);
David B. Sweet, Canal Fulton, OH (US);
Steven C. Brooker, Hartville, OH (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 12/029,015

(22) Filed: Feb. 11, 2008

(65) Prior Publication Data

US 2008/0191096 A1    Aug. 14, 2008

Related U.S. Application Data

(60) Provisional application No. 60/888,978, filed on Feb. 9, 2007.

(51) Int. Cl.
*H01R 39/00* (2006.01)
(52) U.S. Cl. .......................................... 439/17
(58) Field of Classification Search .................. 439/11, 439/1, 19, 17, 21, 22, 13, 27
See application file for complete search history.

(56) References Cited

U.S. PATENT DOCUMENTS

| | | | |
|---|---|---|---|
| 3,581,267 A * | 5/1971 | Schreffler | 439/3 |
| 4,292,502 A | 9/1981 | Adams | |
| 4,659,287 A | 4/1987 | Garavaglia et al. | |
| 5,479,060 A | 12/1995 | Giamati et al. | |
| 5,853,294 A | 12/1998 | Rehder | |
| 5,923,114 A | 7/1999 | Senni | |
| 6,137,082 A | 10/2000 | Pruden et al. | |
| 6,582,237 B2 | 6/2003 | Jacobson | |
| 6,612,847 B2 | 9/2003 | Canizales, Jr. | |
| 6,880,781 B2 | 4/2005 | Fabiani | |
| 7,163,403 B1 | 1/2007 | Klotzle et al. | |
| 2001/0014545 A1 | 8/2001 | Ito et al. | |
| 2007/0218708 A1 | 9/2007 | Bienert | |
| 2007/0257577 A1 | 11/2007 | Bizjak | |

FOREIGN PATENT DOCUMENTS

WO    03078248    9/2003

OTHER PUBLICATIONS

Diamond Antenna; Improved Propeller De-Icing Systems, pp. 1-7.
EP 08 10 1469; European Search Report dated May 13, 2008.

* cited by examiner

*Primary Examiner*—Javaid Nasri
(74) *Attorney, Agent, or Firm*—Murphy IP LLC; Cindy Murphy

(57) ABSTRACT

An electrical-power-transfer assembly (50) transferring electrical power from an onboard power source to electrical deicers (22) on propeller blades (18). The assembly (50) comprises a first race structure (52) mounted to the aircraft, a second race structure (54) mounted to the propeller assembly (12), and rolling elements (76/78) caged in raceway(s) (72/74) situated between the race structures (52/54). The current path established by the assembly (50) passes through the raceway(s) (72/74) and the rolling elements (76/78) caged therein.

20 Claims, 4 Drawing Sheets

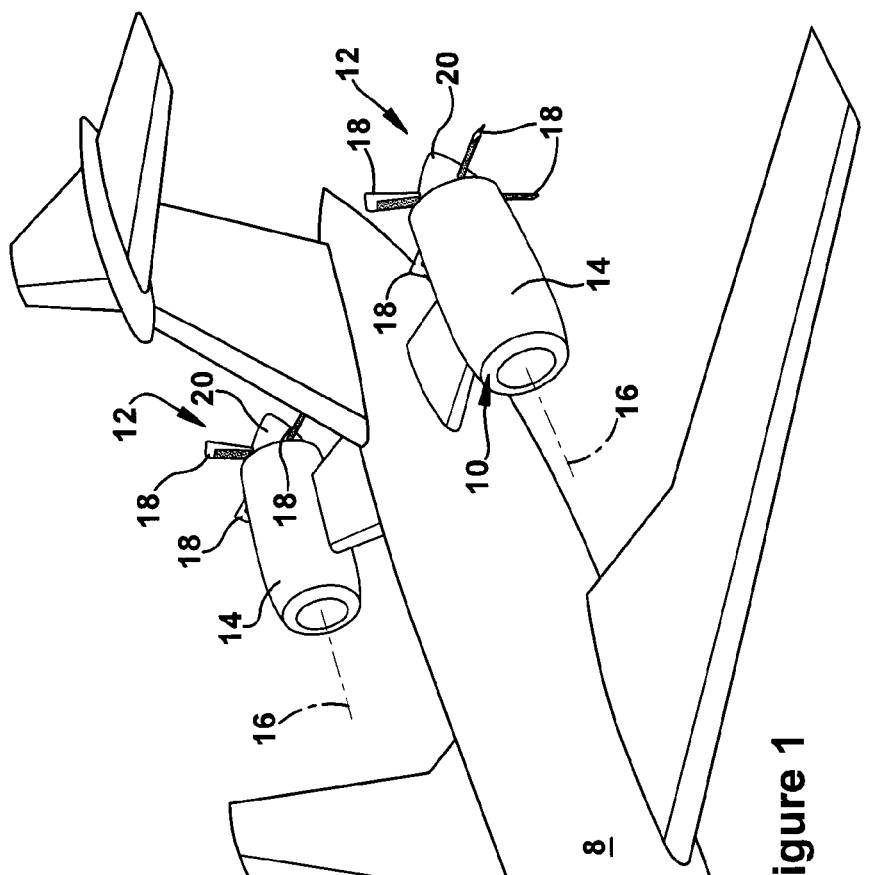
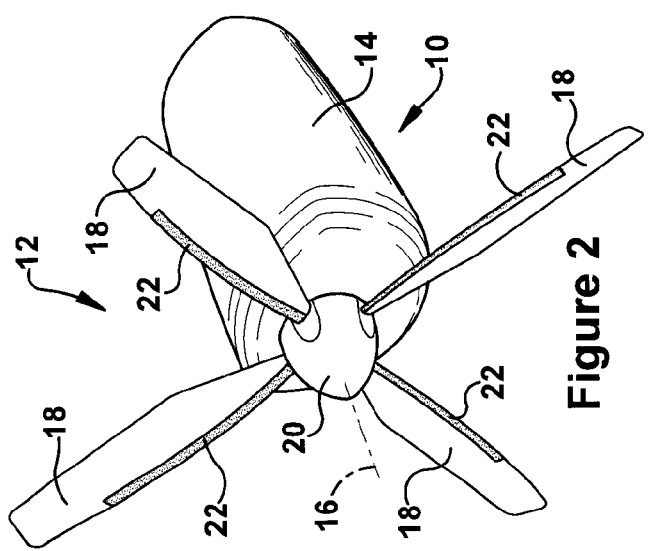

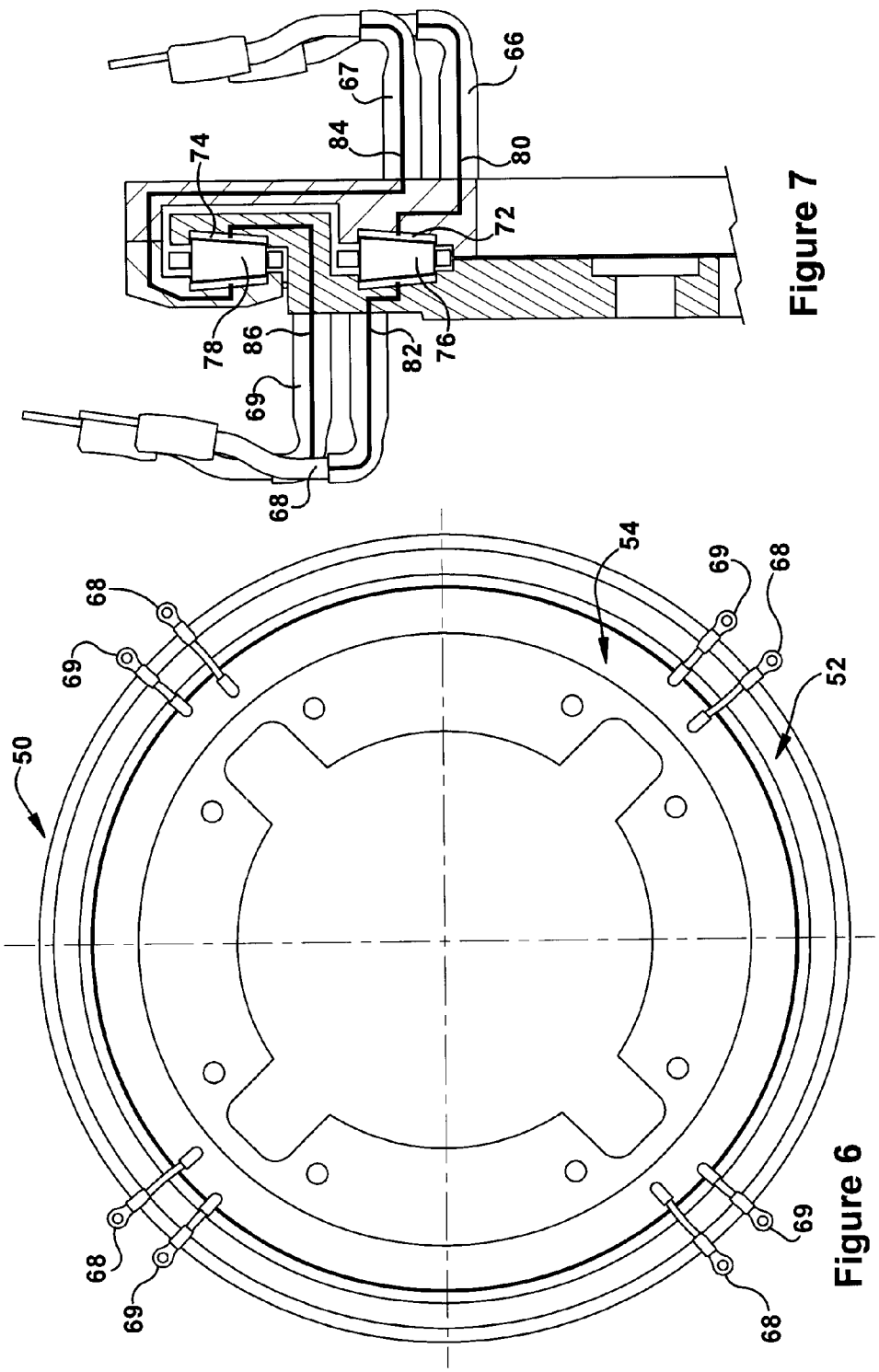

AIRCRAFT PROPELLER ASSEMBLY

RELATED APPLICATION

This application claims priority under 35 U.S.C. §119(e) to U.S. Provisional Patent Application No. 60/888,978 filed on Feb. 9, 2007. The entire disclosure of this provisional application is hereby incorporated by reference.

GENERAL FIELD

An aircraft propeller assembly with electric blade deicer whereby electrical power must be transferred from an onboard source to the rotating propeller parts.

BACKGROUND

An aircraft propeller assembly can comprise a shaft and a plurality of blades connected to the shaft's output end. During operation of the aircraft, the shaft rotates relative to stator parts of the aircraft. If the propeller blades are provided with electrical deicers, electrical power is transferred from an onboard source to the rotating propeller assembly.

SUMMARY

An electrical-power-transfer assembly comprises bearing-like components (e.g., raceways, rolling elements) to establish an electrical power path between a frame assembly and a rotating assembly that rotates relative thereto. Although the transfer assembly may resemble a mechanical-load-carrying bearing, it does not participate in any shaft-supporting duties. The purpose of the raceways and the rolling elements is to establish an electrical path between the frame assembly and the rotating assembly. When used on an aircraft, the electrical-power-transfer assembly can be used, for example, to transfer electrical power from an onboard source to electrical deicers on propeller blades.

DRAWINGS

FIG. 1 is a perspective view of an aircraft with two propeller assemblies.

FIG. 2 is a close-up perspective view of one propeller assembly.

FIG. 6 is an aft view of the electric-power-transfer assembly.

FIG. 7 is a close-up view of a portion of the electric-power-transfer assembly, this view schematically showing current paths established therethrough.

DESCRIPTION

Figure 3:
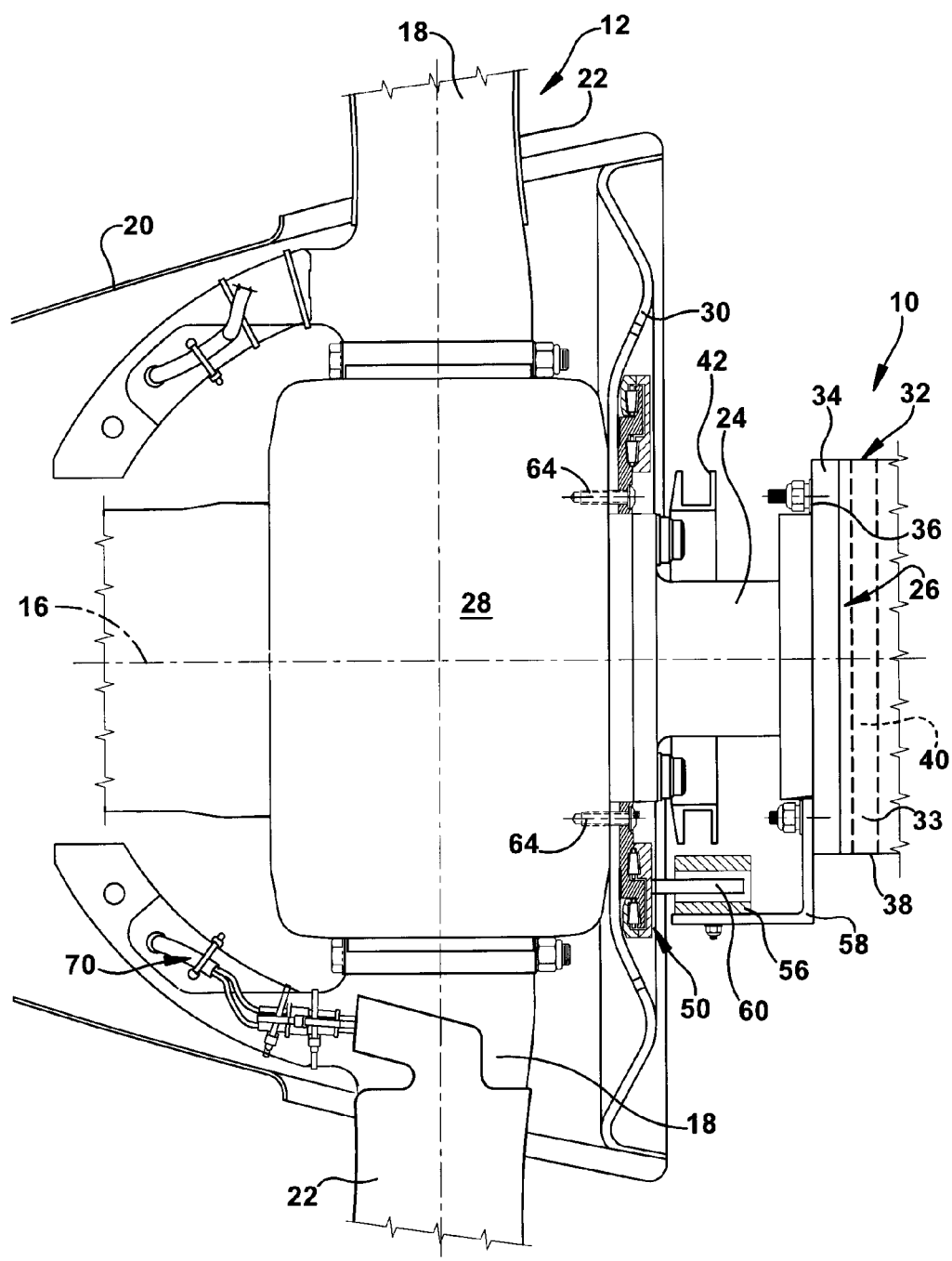
FIG. 3 is a partial-section-partial-reveal view of the propeller assembly, the frame assembly, and the electrical-power-transfer assembly.

Referring now to the drawings, and initially to FIG. 1, an aircraft 8, with two propeller assemblies 12, is shown. Each propeller assembly 12 is driven by a drive assembly (e.g., engine 26 introduced below) housed or covered by a cowling 14. The drive assembly provides propeller motion so that, during operation of the aircraft 8, the propeller assembly 12 rotates relative to the cowling 14 about an axis 16.

As is best seen by referring additionally to FIG. 2, the propeller assembly 12 includes a plurality of blades 18 (e.g., four blades spaced 90° apart) that extend radially outward from a spinner 20. Each blade 18 can include an electrical deicer 22 (e.g., disposed on its leading edge) that requires electrical power transfer thereto from an onboard power source. The blade deicers 22 can comprise, for example, resistive heating elements.

Referring now to FIG. 3, the propeller assembly 12 comprises a shaft 24 that is operably coupled to an engine 26 so that rotational movement may be provided thereto. The output end (or thereabout) of the shaft 24 is attached to a hub 28 and the blades' spars are attached to the hub 28. A bulkhead 30 is attached to the hub 28 and provides an annular mounting platform for fore portions (i.e., portions facing the engine cowling 14) of the spinner 20. The propeller shaft 24 extends through the center hole of the bulkhead 30 and connects to the hub 28. During operation of the aircraft 8, the blades 18, the spinner 20, the shaft 24, and the hub 28 rotate in unison about the axis 16.

The engine 26 can be viewed as having rotor parts, that provide rotational motion to the propeller shaft 24, and stator parts, that remain stationary with respect to engine-produced motion. The stator parts are mounted to the aircraft 8 and can include a casing 32 surrounding the engine's rotor parts. In the illustrated embodiment, the engine casing 32 includes an end wall 34 bolted (e.g., with bolts 36) or otherwise attached to the casing cylindrical side wall 38. The end wall 34 has an opening through which the propeller shaft 24 extends for operative coupling to the engine's rotor parts.

The engine 26 further comprises a mechanical-load-carrying bearing assembly 40 to accommodate the weight, thrust, and/or torque forces generated by the propeller assembly 12. For example, the engine 26 can include a roller-bearing mounted within its stator casing 32 to support the projecting propeller shaft 24. The propeller assembly 12 and/or the drive assembly 26, can include other common accessories, such as a beta ring 42.

The propeller assembly 12 can more generally be called a rotating assembly. The stationary (relative to engine-produced movement) parts on the aircraft 8 can more generally be called a frame assembly 10. In the illustrated embodiment, the frame assembly 10 can comprise, for example, the cowling 14, the engine stator parts, and other related aircraft components.

As was indicated above, the propeller's blade deicers 22 require the transfer of electrical power transfer from an onboard power source. An electrical-power-transfer assembly 50 is provided for this purpose, and it allows the transfer of electrical power over the rotating interface between the frame assembly 10 and the propeller assembly 12. The assembly 50 is "brushless" in that it accomplishes this transfer without the electrically conductive brushes commonly used in such interfaces.

Figure 5:
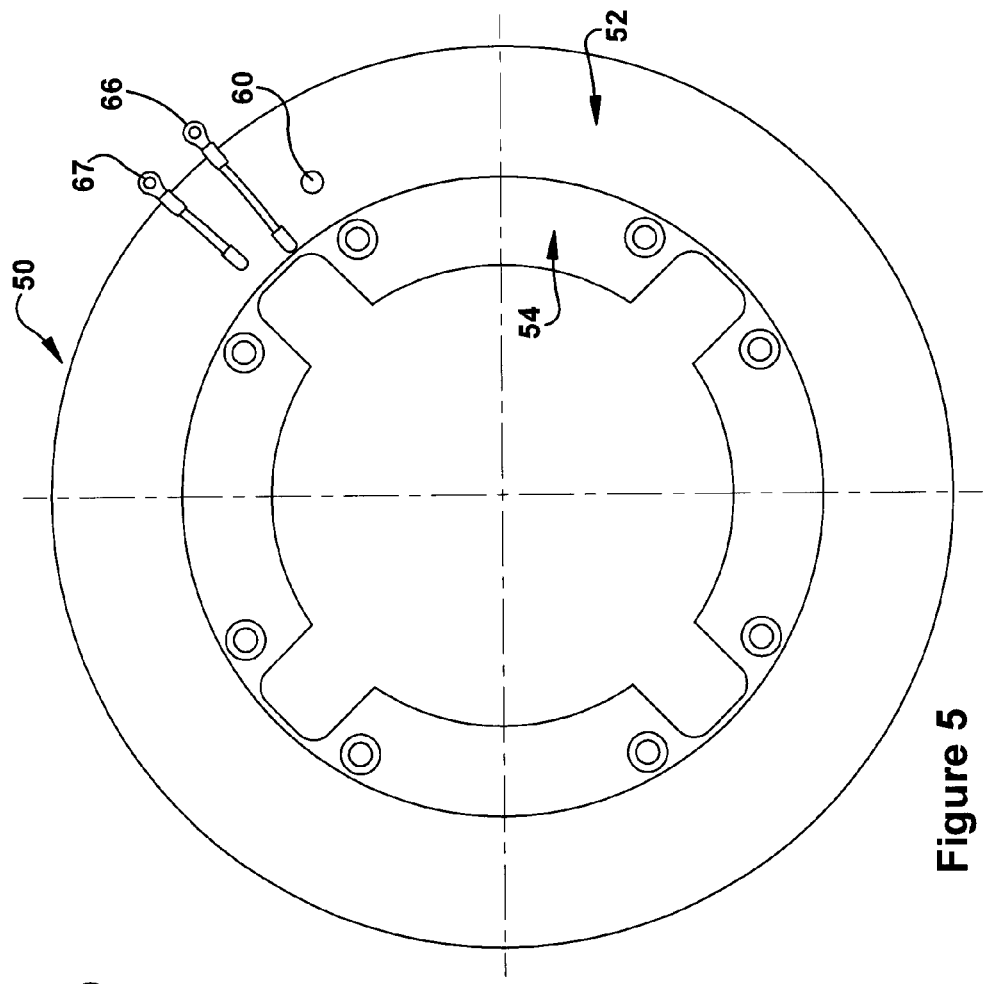
FIG. 5 is a fore view of the electric-power-transfer assembly.
Figure 4:
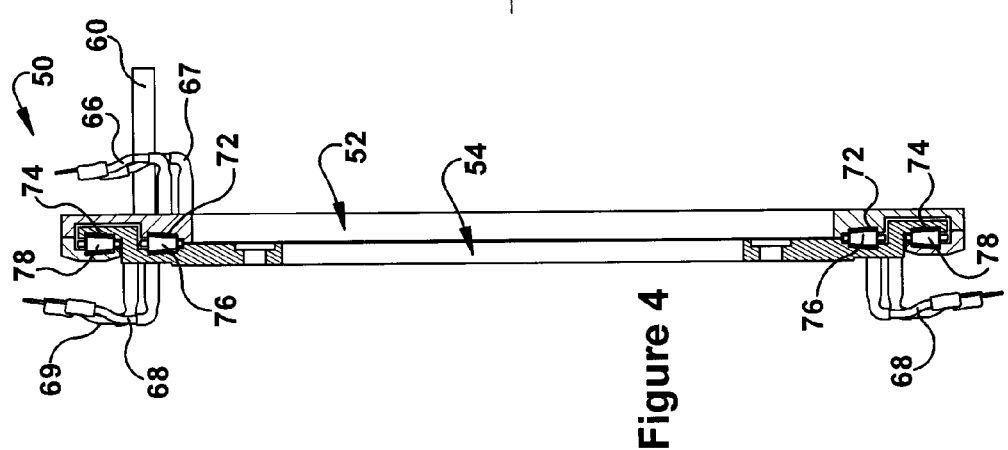
FIG. 4 is a close-up sectional view of the electric-power-transfer assembly.

As is best seen by referring additionally to FIGS. 4-6, the assembly 50 comprises a first race structure 52 and a second race structure 54. The race structures 52/54 can each have a main body made from a non-electrically-conductive material. For example, the structure 52/54 can be molded from a dielectric plastic (with suitable strength) or fabricated from a reinforced resin (e.g., epoxy fiberglass).

The race structures 52/54 can have stepped cross-sectional shapes so as to allow them to be put together in a jigsaw-puzzle-like fashion. (FIG. 4.) At least one of the race structures 52/54 can be made from more than one piece. The illustrated two-piece construction of the first race structure 52 allows an interlocking arrangement between it and the other race structure 54 (which is a one-piece part). This interlocking arrangement captures rolling components of the assembly 50 (i.e., rolling elements 76 and 78, introduced below). That being said, non-stepped cross-sectional shapes, non-interlocking arrangements, and/or two one-piece race structures 52/54 may be possible (and perhaps preferred) in certain situations.

The first race structure 52 is mounted to the frame assembly 10 and the second race structure 54 is mounted to the propeller assembly 12. (FIG. 3.) This race mounting is "fixed" relative to the respective assembly. The first race structure 52 does not rotate with the propeller assembly 12, and the second race structure 54 rotates with (not relative to) the propeller assembly 12.

In the illustrated embodiment, a guide block 56 is mounted to the engine's end wall 34 with a bracket 58. (FIG. 3.) A projection pin 60, attached to and extending axially from the first race structure 52 is received within a channel in the guide block 56. The pin-to-channel sizing is such that first race structure 52 can float relative to the frame assembly 10 to allow limited axial sliding and/or slight radial shifting therebetween. Although not specifically shown in the drawings, and probably not necessary in the illustrated embodiment, a spring or other biasing mechanism can be incorporated into the mount for the first race structure 52.

The second race structure 54 can be directly mounted to the propeller assembly 12. (FIG. 3.) For example, in the illustrated embodiment, the structure 54 is secured to the hub 28 with bolts 64. It is possible for the second race structure 54 to also (or instead) be mounted in a "floating" manner. But a floating feature may be more easily achievable in the race structure 52 mounted to the frame assembly 10.

The electrical-power-transfer assembly 50 can comprise electrical connections 66 and 67 on the first race structure 52 and electrical connections 68 and 69 on the second race structure 54. (FIGS. 4-6.) The electrical connection 66 can be an input connection from the frame assembly 10 and the first race structure 52, and the electrical connection 67 can be an output connection from the first race structure 52 to the frame assembly 10. The electrical connection 68 can be in an input connection from the second race structure 54 to the propeller assembly 12, and the electrical connection 69 can be an output connection from the propeller assembly 12 to the second race structure 54. The input/output electrical connections 68/69 can be connected to an onboard power source. The illustrated assembly 50 has four electrical connections 68 and 69, one for each blade 18. A harness 70 can be positioned within an aft area spinner 20 to route the relative electrical lines from bulkhead connections to the blade deicers 22. (FIG. 3.)

A first raceway 72 is situated between the first race structure 52 and the second race structure 54, and a second raceway 74 is also situated between the race structures 52/54. (FIG. 4.) The raceways 72/74 can be generally concentric with each other and/or the propeller's axis 16, and they can each travel in a circular track around the relevant axis. The illustrated raceways 72/74 are radially offset relative to each other with the first raceway 72 being positioned radially inward of the second raceway 74.

In the illustrated embodiment, the raceways 72 and 74 are formed by aligned circumferential grooves in abutting axial faces of the race structures 52 and 54. (FIG. 4.) The raceways could instead be formed by a face groove in only one of the structures 52/54 and the aligned "ungrooved" surface of the other structure 54/52. Non-grooved raceways are also possible and contemplated.

A first set of rolling elements 76 are caged in the first raceway 72, and a second set of rolling element 78 are caged in the second raceway 74. (FIG. 4.) As the propeller assembly 12 rotates relative to the frame assembly 10, and the second race structure 54 rotates relative to the first race structure 52, the rolling elements 76/78 roll and slide in their respective raceways 72/74. The elements 76/78 can comprise any construction (e.g., spherical balls, cylindrical rollers, tapered rolls) that results in their low-friction rolling and sliding within the raceways 72/74.

The electrical-power-transfer assembly 50 resembles a conventional bearing in that it has raceways 72/74 and rolling elements 76/78 caged therein. But in the assembly 50, the race structures 52/54 do not participate in any mechanical-load-carrying duties for the propeller assembly 12. This feature is easily seen in the illustrated assembly 50, due to the floating mount of the race structure 52, the non-movement of the race structure 54 relative to the propeller assembly 12, the non-correspondence (in a bearing sense) of the rolling axis of the elements 76/78 relative to the rotation of the assembly 12. But such floating, non-movement and/or non-correspondence are not necessary to avoid qualifying as a non-load-carrying bearing for the rotating assembly 12.

As is best seen by referring additionally to FIG. 7, the electrical-power-transfer assembly 50 establishes two current paths. One current path (e.g., an input current path) travels from the electrical connection 66 to the electrical connection 68, and comprises internal line 80 (from connection 66 to the first raceway 72), the first raceway 72 and/or the first set of roller elements 76, and internal line 82 (from the first raceway 72 to the connection 68). The other current path (e.g., an output current path) travels from electrical connection 69 to electrical connection 67, and comprises internal line 86 (from connection 69 to the second raceway 74), the second raceway 74 and/or the second set of roller elements 78, and internal line 84 (from the second raceway 74 to the connection 67).

The raceways 72 and 74 (and thus separate sets of rolling elements 76 and 78) are electrically isolated from each other. In the illustrated embodiment, both the raceways 72/74 and the rolling elements 76/78 are part of their respective current paths. Otherwise dielectric raceways 72/74 can be made electrically conductive by the addition of coatings and/or insert rings. The rolling elements 76/78 can be completely or partially formed of an electrically conductive material, and are in electrical contact with their respective raceway 72/74.

The electrical conductivity of the raceways 72/74 and/or the rolling elements 76/78 can be sustained by providing seals (e.g., probably dielectric and definitely rotation-accommodating seals) at the interfacing radial edges of the race structures 52/54. Such seals can serve to prevent leakage into the raceways 72/74 of electrical-conduction-destroying or otherwise contaminating fluids (e.g., conventional lubricant oil). (If lubricant is required, an electrically-conductive lubricant, such as a graphite lubricant, can be used.)

In some cases, it may not be necessary for the raceways 72/74 to be electrically conductive, if conductive rolling elements 76/78 can sufficiently establish the current path with the internal lines. Additionally or alternatively, if the assembly 50 only needs to provide one current path (i.e., the input/output for completing the circuit is otherwise provided), only one raceway 72/74 (and thus only one set of rolling elements 76/78), may be required. Conversely, more than two raceways (and/or more than two sets of rolling elements) are also possible and contemplated, to form further parts of input/output paths, or additional paths. Furthermore, the pancake-style of the illustrated assembly 50 is not crucial and other styles (e.g., a drum-style) could be used instead.

In any event, the electrical-power-transfer assembly 50 can establish the current path 80 regardless of the rotational position of the electrical connections 66/68 to each other, and/or regardless of the rotational position of the race structures 52/54 (and/or the raceways 72/74) to each other.

The electrical-power-transfer assembly 50 need not be used with a propeller assembly, need not be used to power deicing systems, and/or need not even be associated with an aircraft. The assembly 50 may find application in any situation wherein a current path needs to be established between a frame assembly and a rotating assembly.

Although the electrical-power-transfer assembly 50 has been shown and described with respect to a certain embodiment, it is obvious that equivalent alterations and modifications will occur to others skilled in the art upon the reading and understanding of this specification and the annexed drawings. In regard to the various functions performed by the above described elements (e.g., components, assemblies, systems, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function. In addition, while a particular feature may have been described above with respect to only one situation, embodiment, or component, such feature may be combined with one or more other features of other embodiments and components, as may be desired and advantageous for any given or particular application.

The invention claimed is:

1. An electrical-power-transfer assembly for transferring electrical power between a frame assembly and a rotating assembly that rotates relative to the frame assembly around a rotating axis, said electrical-power-transfer assembly comprising:
   a first race structure mounted to the frame assembly;
   a second race structure mounted to the rotating assembly;
   an electrical connection from the first race structure to the frame assembly and an electrical connection from the second race structure to the rotating assembly;
   a first raceway situated between the first race structure and the second race structure;
   a first set of rolling elements caged in the first raceway for rolling and sliding movement therewithin; and
   a current path established between the electrical connections, this current path passing through the first raceway and/or the first set of rolling elements;
   wherein the first race structure and the second race structure have facing axial faces and wherein the first raceway is formed by a circumferential groove in the axial face of the first race structure and/or a circumferential groove in the axial face of the second race structure.

2. An electrical-power-transfer assembly as set forth in claim 1, characterized by the absence of brushes in the current path.

3. An electrical-power-transfer assembly as set forth in claim 2, wherein the first race structure and the second race structure each have a main body made from a non-electrically-conductive material, and wherein at least one of the first raceway and the first set of rolling elements, is electrically conductive.

4. An electrical-power-transfer assembly for transferring electrical power between a frame assembly and a rotating assembly that rotates relative to the frame assembly; said electrical-power-transfer assembly comprising:
   a first race structure mounted to the frame assembly;
   a second race structure mounted to the rotating assembly;
   an electrical connection from the first race structure to the frame assembly and an electrical connection from the second race structure to the rotating assembly;
   a first raceway situated between the first race structure and the second race structure;
   a first set of rolling elements caged in the first raceway for rolling and sliding movement therewithin; and
   a current path established between the electrical connections, this current path passing through the first raceway and/or the first set of rolling elements;
   characterized by the first race structure and the second race structure not being part of the mechanical-load-carrying bearing assembly for the rotating assembly, and characterized by the absence of brushes in the current path;
   wherein the first race structure and the second race structure each have a main body made from a non-electrically-conductive material, and wherein at least one of the first raceway and the first set of rolling elements, is electrically conductive;
   wherein the first race structure and the second race structure have facing axial faces; and
   wherein the first raceway is formed by a circumferential groove in the axial face of the first race structure and/or a circumferential groove in the axial face of the second race structure.

5. An electrical-power-transfer assembly as set forth in claim 4, wherein the first raceway is electrically conductive.

6. An electrical-power-transfer assembly as set forth in claim 5, wherein the rolling element(s) in the first set is made of an electrically conductive material.

7. An electrical-power-transfer assembly as set forth in claim 1, wherein the first raceway is continuous in a circular path around the rotating axis of the rotating assembly.

8. An electrical-power-transfer assembly for transferring electrical power between a frame assembly and a rotating assembly that rotates relative to the frame assembly; said electrical-power-transfer assembly comprising:
   a first race structure mounted to the frame assembly;
   a second race structure mounted to the rotating assembly;
   an electrical connection from the first race structure to the frame assembly and an electrical connection from the second race structure to the rotating assembly;
   a first raceway situated between the first race structure and the second race structure;
   a first set of rolling elements caged in the first raceway for rolling and sliding movement therewithin; and
   a current path established between the electrical connections, this current path passing through the first raceway and/or the first set of rolling elements;
   characterized by the first race structure and the second race structure not being part of the mechanical-load-carrying bearing assembly for the rotating assembly;
   wherein the first race structure floats relative to the frame assembly to allow limited axial sliding and/or slight radial shifting therebetween.

9. An electrical-power-transfer assembly for transferring electrical power between a frame assembly and a rotating assembly that rotates relative to the frame assembly around a rotating axis; said electrical-power-transfer assembly comprising:
   a first race structure mounted to the frame assembly;
   a second race structure mounted to the rotating assembly;
   an electrical connection from the first race structure to the frame assembly and an electrical connection from the second race structure to the rotating assembly;

a first raceway situated between the first race structure and the second race structure;

a first set of rolling elements caged in the first raceway for rolling and sliding movement therewithin; and a current path established between the electrical connections, this current path passing through the first raceway and/or the first set of rolling elements;

a second raceway situated between the first race structure and the second race structure;

a second set of rolling elements caged in the second raceway for rolling and sliding movement therewithin; and another electrical connection from the first race structure to the rotating assembly, another electrical connection from the second race structure to the frame assembly, and another current path established therebetween, this other current path passing through the second raceway and/or the second set of rolling elements.

10. An electrical-power-transfer assembly as set forth in claim 9, wherein one of the electrical connections from the first race structure is an input connection and the other is an output connection;

wherein one of the electrical connections from the second race structure is an input connection and the other is an output connection; and wherein one current path extends between the input connections and it is an input current path, and the other current path extends between the output connections and it is an output current path.

11. An electrical-power-transfer assembly as set forth in claim 10, characterized by the absence of brushes in the current path.

12. An electrical-power-transfer assembly as set forth in claim 11, wherein:

the first race structure and the second race structure each have a main body made from a non-electrically-conductive material, at least one of the first raceway and the first set of rolling elements is electrically conductive; and at least one of the second raceway and the second set of rolling elements are electrically conductive.

13. An electrical-power-transfer assembly as set forth in claim 12, wherein the first race structure and the second race structure have facing axial faces;

wherein the first raceway is formed by a circumferential groove in the axial face of the first race structure and/or a circumferential groove in the axial face of the second race structure; and wherein the second raceway is formed by a circumferential groove in the axial face of the first race structure and/or a circumferential groove in the axial face of the second race structure.

14. An electrical-power-transfer assembly as set forth in claim 13, wherein the rolling elements in the first and second sets are made of an electrically conductive materials.

15. An electrical-power-transfer assembly as set forth in claim 13, wherein the first raceway and the second raceway are each electrically conductive.

16. An electrical-power-transfer assembly as set forth in claim 15, wherein the first raceway and the second raceway each travel in a circular track generally around the rotating axis of the rotating assembly.

17. An electrical-power-transfer assembly as set forth in claim 16, wherein the first raceway radially offset from the second raceway.

18. An apparatus comprising:
the frame assembly;
the rotating assembly that rotates relative to the frame assembly;
a mechanical-load-carrying bearing assembly rotatably mounting the rotating assembly to the frame assembly;
a drive assembly driving the rotation of the rotating assembly; and
the electrical-power-transfer assembly set forth in claim 1, for transferring electrical power between the frame assembly and the rotating assembly.

19. An apparatus as set forth in claim 18, wherein the rotating assembly is an assembly comprising a plurality of blades.

20. An apparatus as set forth in claim 19, wherein the frame assembly comprises aircraft parts that are stationary relative to rotational movement produced by the drive assembly.

* * * * *